US007009973B2

(12) United States Patent
Cao et al.

(10) Patent No.: US 7,009,973 B2
(45) Date of Patent: Mar. 7, 2006

(54) SWITCH USING A SEGMENTED RING

(75) Inventors: Jun Cao, Sunnyvale, CA (US);
William Dai, San Jose, CA (US);
Yongbum Kim, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 942 days.

(21) Appl. No.: 09/794,948

(22) Filed: Feb. 28, 2001

(65) Prior Publication Data

US 2001/0033571 A1  Oct. 25, 2001

Related U.S. Application Data

(60) Provisional application No. 60/185,271, filed on Feb. 28, 2000.

(51) Int. Cl.
*H04L 12/56* (2006.01)
(52) U.S. Cl. ..................................... 370/392; 370/469
(58) Field of Classification Search ............... 370/235, 370/258, 389, 392, 403, 469, 475
See application file for complete search history.

(56) References Cited

U.S. PATENT DOCUMENTS

| 5,278,789 A | 1/1994 | Inoue et al. |
| 5,390,173 A | 2/1995 | Spinney et al. |
| 5,414,704 A | 5/1995 | Spinney |
| 5,423,015 A | 6/1995 | Chung |
| 5,459,717 A | 10/1995 | Mullan et al. |
| 5,473,607 A | 12/1995 | Hausman et al. |
| 5,499,295 A | 3/1996 | Cooper |
| 5,524,254 A | 6/1996 | Morgan et al. |
| 5,555,398 A | 9/1996 | Raman |
| 5,568,477 A | 10/1996 | Galand et al. |
| 5,579,301 A | 11/1996 | Ganson et al. |
| 5,644,784 A | 7/1997 | Peek |

(Continued)

FOREIGN PATENT DOCUMENTS

EP          0312917 A2     4/1989

(Continued)

OTHER PUBLICATIONS

"A High-Speed CMOS Circuit for 1.2-Gb/s 16 x 16 ATM Switching," Alain Chemarin et al. 8107 IEEE Journal of Solid-State Circuits 27 (1992) Jul., No. 7, New York, US, pp. 1116-1120.

(Continued)

*Primary Examiner*—Chi Pham
*Assistant Examiner*—Anh-Vu Ly
(74) *Attorney, Agent, or Firm*—Squire, Sanders & Dempsey L.L.P.

(57) ABSTRACT

A network switch is disclosed having at least one data port interface for receiving data and at least one link interface configured to transmit the data between the network switch and other network switches. The switch contains a data processor, having a segmented ring with a plurality of dedicated modules designed to process the data connected through that ring. A programmable ring dispatcher dispatches at least a portion of the data along a segmented ring to at least one of the dedicated modules. The data processor also has a command processor for processing commands received from the dedicated modules. The programmable ring dispatcher determines the first dedicated module to receive the portion of the data and that first dedicated module thereafter determines the next destination for the data potion. Because the dedicated modules can be added to or taken out the switch architecture based on the network environment, the switch is scalable and adaptable.

9 Claims, 2 Drawing Sheets

U.S. PATENT DOCUMENTS

| | | |
|---|---|---|
| 5,652,579 A | 7/1997 | Yamada et al. |
| 5,696,899 A | 12/1997 | Kalwitz |
| 5,742,613 A | 4/1998 | MacDonald |
| 5,748,631 A | 5/1998 | Bergantino et al. |
| 5,781,549 A | 7/1998 | Dai |
| 5,787,084 A | 7/1998 | Hoang et al. |
| 5,790,539 A | 8/1998 | Chao et al. |
| 5,802,052 A | 9/1998 | Venkataraman |
| 5,802,287 A | 9/1998 | Rostoker et al. |
| 5,825,772 A | 10/1998 | Dobbins et al. |
| 5,828,653 A | 10/1998 | Goss |
| 5,831,980 A | 11/1998 | Varma et al. |
| 5,842,038 A | 11/1998 | Williams et al. |
| 5,845,081 A | 12/1998 | Rangarajan et al. |
| 5,887,187 A | 3/1999 | Rostoker et al. |
| 5,892,922 A | 4/1999 | Lorenz |
| 5,898,687 A | 4/1999 | Harriman et al. |
| 5,909,686 A | 6/1999 | Muller et al. |
| 5,918,074 A | 6/1999 | Wright et al. |
| 5,940,596 A | 8/1999 | Rajan et al. |
| 5,987,507 A | 11/1999 | Creedon et al. |
| 6,011,795 A | 1/2000 | Varghese et al. |
| 6,041,053 A | 3/2000 | Douceur et al. |
| 6,047,002 A * | 4/2000 | Hartmann et al. ........... 370/466 |
| 6,061,351 A | 5/2000 | Erimli et al. |
| 6,088,356 A * | 7/2000 | Hendel et al. .............. 370/392 |
| 6,119,196 A | 9/2000 | Muller et al. |
| 6,122,285 A * | 9/2000 | Okada ......................... 370/450 |
| 6,175,902 B1 | 1/2001 | Runaldue et al. |
| 6,185,185 B1 | 2/2001 | Bass et al. |
| 6,266,700 B1 * | 7/2001 | Baker et al. ................ 370/401 |
| 6,356,951 B1 * | 3/2002 | Gentry, Jr. .................. 709/250 |

FOREIGN PATENT DOCUMENTS

| | | |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 99/00948 | 1/1998 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00949 | 1/1999 |
| WO | WO 99/00950 | 1/1999 |
| WO | WO99/00936 A1 | 6/2001 |

OTHER PUBLICATIONS

"Local Area Network Switch Frame Lookup Technique for Increased Speed and Flexibility," 700 IBM Technical Disclosure Bulletin 38(1995) Jul., No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8 x 8 ATM Switch Chip Set with Shared Multibuffer Architecture," Harufusa Kondoh et al., 8107 IEEE Journal of Solid-State Circuits 28(1993) Jul., No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall INT., USA, XP-002147300(1998), Sec. 5.2-Sec. 5.3, pp. 309-320.

* cited by examiner

SWITCH USING A SEGMENTED RING

REFERENCE TO RELATED APPLICATIONS

This application claims priority to U.S. Provisional Patent Application Ser. No. 60/185,271, filed on Feb. 28, 2000. The contents of this patent application is hereby incorporated by reference.

BACKGROUND OF THE INVENTION

1. Field of the Invention

The invention relates to a method and apparatus for high performance switching in local area communications networks such as token ring, ATM, ethernet, fast ethernet, and gigabit ethernet environments, generally known as LANs. In particular, the invention relates to a high bandwidth architecture for an optical switch or packet processor and methods that provide efficient processing of cell and packetized data by the optical switch or packet processor.

2. Description of the Related Art

As computer performance has increased in recent years, the demands on computer networks have increased. Faster computer processors and higher memory capabilities need networks having high bandwidths to enable high speed transfer of significant amounts of data. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks.

Switches, as they relate to computer networking, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic ethernet wirespeed is up to 10 megabits per second, and Fast Ethernet is up to 100 megabits per second. The newest ethernet is referred to as gigabit (Gbit) ethernet, and is capable of transmitting data over a network at a rate of up to 1,000 megabits per second.

With increasing speed in computer processors and higher memory capabilities, the need for high speed switches capable of 10 Gbit and 40 Gbit processing is becoming apparent. The hardware and software systems designed to meet the performance criteria for the next generation of switches have a common set of problems. These include handling data at 10 Gbit rates, adequate multicast replication and forwarding, and issues with Quality of Service (QoS) and Service Level Agreement (SLA). The latter are important in determining raw queue behavior, latency and congestion and providing traffic policing, bandwidth management and SLA support.

In the prior art, the ability to process at the 10 Gbit rate and above is limited by the software used in switching and packet processing. To overcome such limitations, dedicated hardware can be used to do the processing and have the software be concerned with the higher-level functions of the switch. Such dedicated hardware can be implemented in network components and can provide the desired functionality at the desired speeds. The difficulty with dedicated hardware solutions is that they are, by design, directed to specific processing environments and many different network components would be necessary to meet the needs of differing network setups.

Because of this, there is a need in the prior art for a network switch that is fully scalable and fully configurable to differing network environments. There is also a need for a switch can perform dedicated packet processing based on the hardware and rely minimally on higher level software and still be adaptable to varying network architectures. There is also a need in the prior art of a method of switching packets on a network switch that is highly customizable and still able to switch packet at high speeds.

SUMMARY OF THE INVENTION

Accordingly, it is a principal object of the present invention to provide a switch that can operate at higher switching rates and adaptable to different network configurations. The present invention provides for dedicated modules, that can be swapped in or out depending on the needs of the switching environment, and an architecture that passes information to these dedicated modules and allows the modules to request more information and/or pass the information to another module. Based on the dedicated modules configured in the architecture, the switch can handle routing specific to the network requirements into which the switch is placed. Thus, the switch is fully scalable and can achieve higher switching rates because of the dedicated hardware modules.

The present invention is directed to a network switch, the network switch comprising at least one data port interface for receiving data, at least one link interface configured to transmit the data between the network switch and other network switches, and a data processor, connected to the at least one data port interface and the at least one link interface. The data processor has a segmented ring with a plurality of dedicated modules designed to process the data, a programmable ring dispatcher for dispatching at least a portion of the data along the segmented ring to at least one of the plurality of dedicated modules, and a command processor for processing commands received from the dedicated modules. The programmable ring dispatcher determines a first dedicated module of the plurality of dedicated modules to receive the portion of said data and the first dedicated module determines a next destination for the portion of the data selected from the plurality of dedicated modules and the command processor.

In a particular embodiment, the data received by the network switch is in the form of packets having headers, the portion of the data sent to the ring is a parsed field derived from the headers. Additionally, the programmable ring dispatcher has a set of rules for determining which of the plurality of dedicated modules receives the parsed field based on values contained in the parsed field and dispatches the parsed field to the determined dedicated module. The plurality of dedicated modules can be varied in number and type depending on the networking environment of the network switch.

The present invention is also directed to a method of processing data by a network switch. The steps of the method include receiving data by the network switch and parsing the data to obtain a portion of the data. At least portion of the data is dispatched along a segmented ring having a plurality of dedicated modules designed to process the data. A first dedicated module of the plurality of dedicated modules receives the data portion based on the content of data portion. The data is processed by the first dedicated module and then the first dedicated module dispatches at least the portion of the data along the segmented ring to additional dedicated modules or to a command processor of the network switch. The data is forwarded from the network switch based on the processing performed by the dedicated modules.

In a specific embodiment, the method of processing data by a network switch includes a step of parsing packets having headers to obtain a parsed field derived from the headers. Additionally, the dispatching at least portion of the data can be performed according to a set of rules for determining which of the plurality of dedicated modules receives the parsed field based on values contained in the parsed field. Also, the dispatching to a specified plurality of dedicated modules is possible, where the number and type of the dedicated modules are varied based on the networking environment of the network switch The above and other objects, features and advantages of the invention will become apparent from the following description of the preferred embodiment taken in conjunction with the accompanying drawings.

DESCRIPTION OF THE PREFERRED EMBODIMENTS

The present invention is directed to a network switch and a method for processing data by a network switch. The present invention provides of a high bandwidth architecture to ensure that data is not dropped and that data packets are managed effectively. The architecture of the present invention creates a separate channel for the datapath and forwarding/management information in each packet or cell. A ring structure is used to manage the Header/Delivery/Priority/Management information for the packets or cells while the datagram is handled by a packet processor. The architecture allows for a modular building block approach based on a programmable dispatcher and application specific and/or protocol specific processors designed for the ring.

In the context of the present application, a packet is defined as the entire transmitted bit sequence as viewed on a network medium, from the first bit of the preamble sequence to the last bit of the Frame Check Sequence (FCS) field. A frame is a portion of a packet that includes the destination address, source address, length or type and FCS fields, but excludes the preamble sequence. A packet also contains headers which contain control information regarding encapsulated data included in the packets for network transmission. A cell is a fixed-length unit used in Asynchronous Transfer Mode (ATM) networks to support multiple classes of service. Additionally, most networking applications are discussed with respect to the Open Systems Interconnection (OSI) 7-layer model. Layers 1 and 2 (L1 and L2) refer to the physical layer and the data link layer, where the physical layer is concerned with the transmission of raw bits over a communication channel and the data link layer is concerned with dividing data into frames and acknowledging receipt of frames. Layer 3 (L3) is the network layer and is concerned with the routing of information and packet congestion control. Layer 4 (L4) is the transport layer and is concerned with creating and managing connections between senders and recipients.

Figure 1:
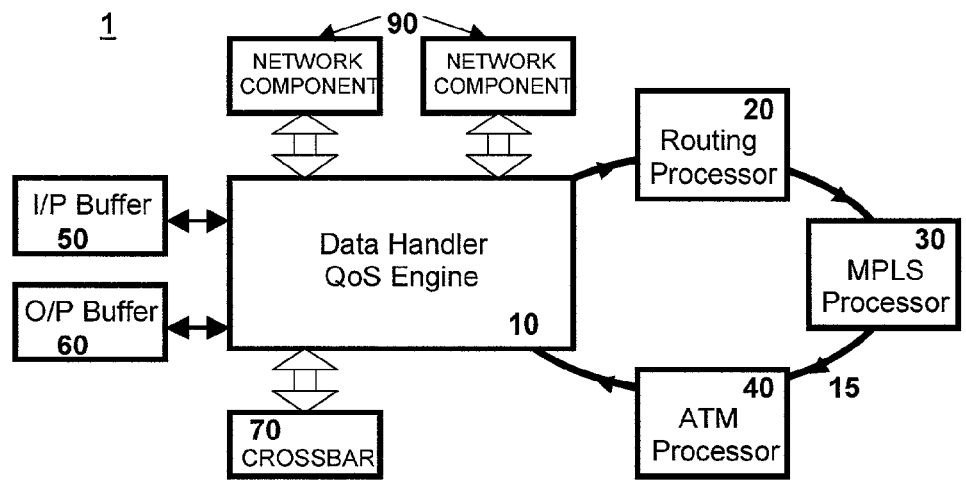
FIG. 1 is a schematic illustrating portions of the network switch of the present invention.

A schematic illustrating portions of the network switch of the present invention is shown in FIG. 1. The data handler Quality Of Service (QoS) engine 10 is the main portion of the network switch of the present invention. The data handler receives and sends internal data through the input and output buffers 50, 60 to a RAMBus having memory used to facilitate the operations of the packet or cell processor. The data handler also has interfaces with other network components 90 and communicates with the other switches through a switch fabric 70.

An important element of the present invention is the implementation of a segmented ring 15. The ring architecture allow for designated modules, such as processors denoted as 20, 30 and 40, to be added depending the functionality desired and the nature of the network. Illustrated in FIG. 1 is routing processor 20 that process packet or cell information and provides proper routing through a lookup in a database. A MultiProtocol Label Switching (MPLS) processor 30 can also be included in the segmented ring and acts to perform label to label switching and attachment. Also, an ATM processor 40 can be included on the segmented ring and can act to process ATM cells. While the above designated modules have been discussed, one clear benefit of the present invention is that many different types of designated modules may be employed and the above examples should not be viewed as limiting.

Figure 2:
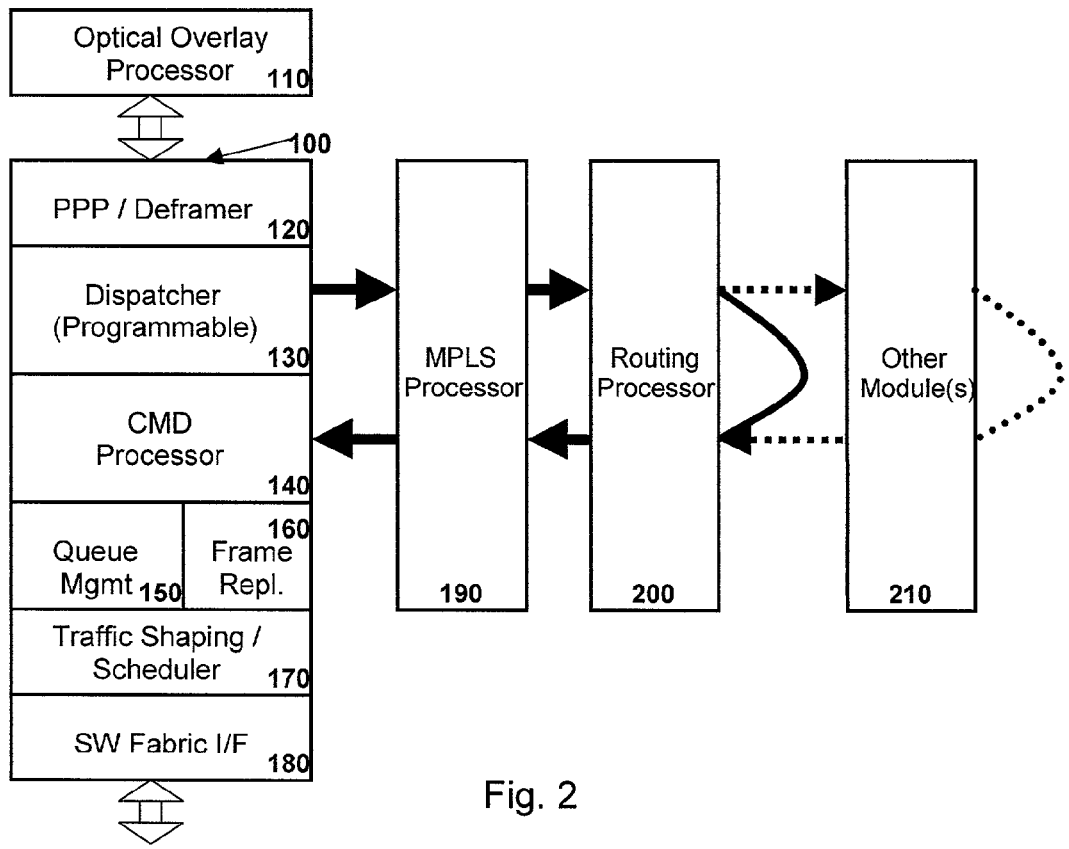
FIG. 2 is a schematic showing modular structure of the switch showing the ring structure used to manage information related to each packet or cell.
Figure 3:
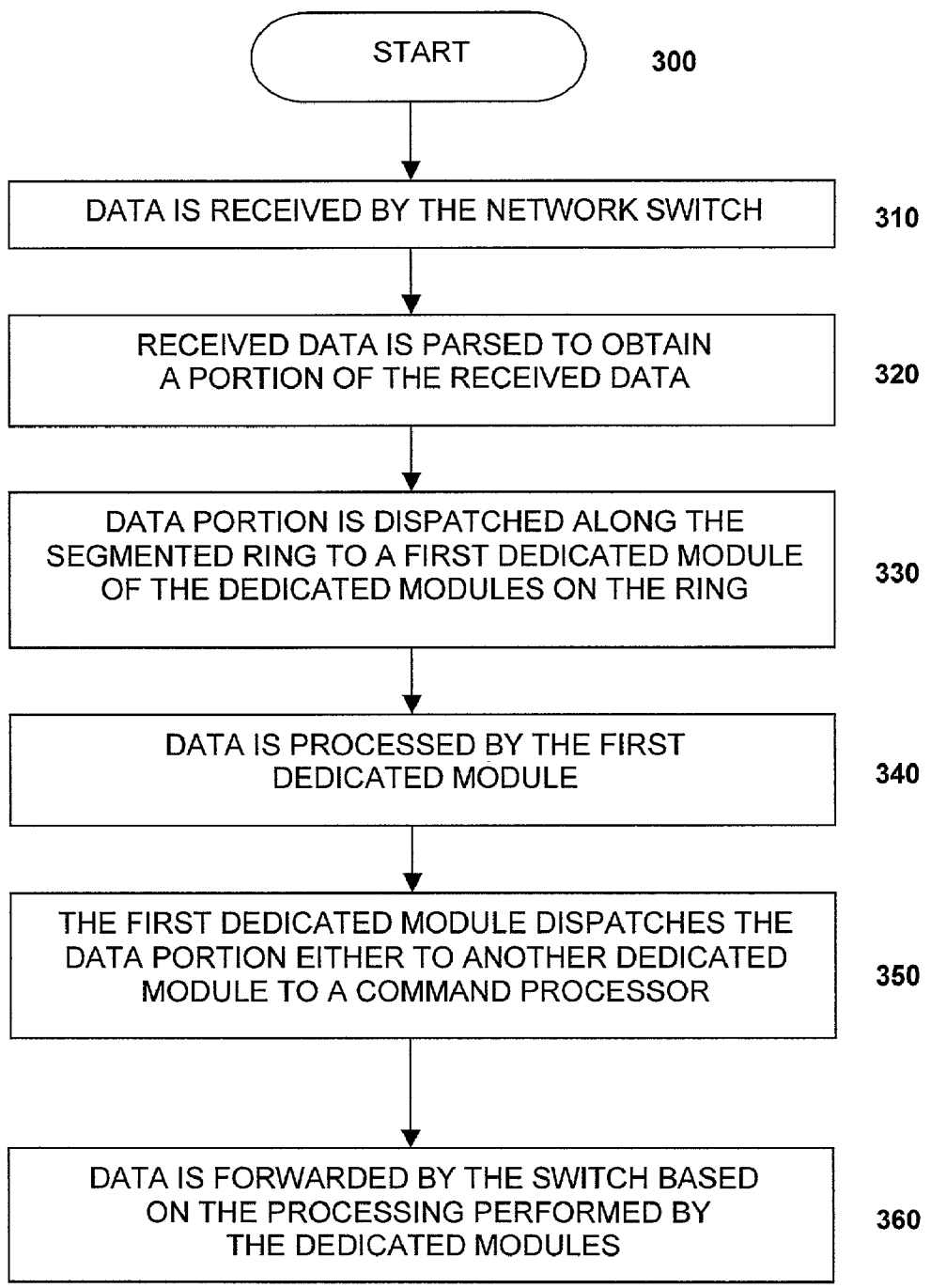
FIG. 3 is a flow chart illustrating the general method of the present invention.

A preferred embodiment of the present invention is illustrated in FIG. 2, directed to an optical switch or packet processor. This embodiment of the present invention is especially well suited to optical internet processing because of the requirements of a high bandwidth architecture to ensure that data is not dropped and that packets are managed effectively. With respect to this embodiment, the optical overlay processor 110 includes the optical transceiver physical layer as an interface to the optical source and a framer to supply the data in the proper format to the optical packet processor 100.

Segments of the optical packet processor will now be discussed. The PPP/deframer block (120) deframes the packets and performs an ingress frame error check, including evaluating the FCS and the L3 Checksum. The block then parses the L2, L3 and L4 headers to provide parsed fields that typify the packet. The parsed fields are then passed on the programmable dispatcher 130.

The programmable dispatcher dispatches the parsed fields related to the frame headers to one of the designated modules 190, 200 and 210, where the designated modules are of the type discussed above. The dispatcher uses sequential rules to determine the designated modules to which the parsed field is sent. These rules provide that the dispatcher looks at the frame type and then the L2, L3 and L4 fields to make the determination. The dispatcher can also look at any arbitrary value in the header fields to determine the destination.

It is noted the designated modules can pass the parsed fields on to another designated module after it is done with its individual processing. The designated modules can also pass the parsed fields through the ring to the command processor 140 when it processing or evaluating is finished.

The subsequent forwarding of parsed data is dependent on the designated module. For example, for certain architectures, the MPLS processor might always forward to the routing processor or some other module. In addition, a designated module can also send a request through the ring to have the entire packet or other portions thereof forwarded to the designated module if parsed fields are not sufficient for the processing by the module.

The command processor 140 process commands received from the designated modules. These can be related to queue and flow class assignments, conditional behavior upon destination congestion and fragmentation. The command processor can also replace frame headers that have been modified by the designated modules, can replicate frames as needed, e.g. IP multicast, and setting the frame type selection on egress.

Queue and buffer management block 150 buffers holds ingress packet frame and associates buffers with class Ids. The block also supports fragmentation and frame multicast to the switch fabric interface. The frame replacement block 160 provides a L2 frame type on egress and performs FCS and Checksum calculations again as necessary.

The scheduler/traffic shaper block 170 provides different functions depending on whether the ingress or egress datapath is followed. The scheduler provides for a proper performance for a transmission that reflects its transmission quality and service availability. The scheduler shapes the flow based on the frame egress queue. The traffic shaper provides management of the transmit buffer and queue for data flowing from the switch fabric. The traffic shaper provides for early detection of congestion and dropping of packets.

The switch fabric interface block 180 acts as an interface between the optical packet processor 100 and the switch fabric or crossbar. The interface supports 65 ingress and egress interleaved flow and has bandwidth/frame counters for support service level agreement (SLA) support.

The method of one embodiment of the present invention will now be discussed. The process begins at step 310 when data is received by the network switch. The data received is parsed to obtain a portion of the received data that provides characteristics of the received data. In the case of packet processing, the data is in the form of packets and headers in the packets are used to provide the parsed data. The data portion is dispatched by the programmable dispatcher to a first designated module, where there are a plurality of designated modules connected by a segmented ring.

The data and/or the data portion is processed by the first designated module. The processes performed by the first designated module are specific to that module. The first designated module dispatches the data portion to either another dedicated module for additional processing or to a command processor. After the data has been processed by the dedicated processors, the data is forwarded based on the processes performed and the information obtained by the processes.

Although the preferred embodiment discussed above is directed to an optical switch, the architecture and methods of the present invention is also applicable to other types switches that are not optical switches. Other types of switches and packet processors can benefit from the high bandwidth ring architecture disclosed herein.

Although embodiments of the present invention have been described in detail, it will be understood that the present invention is not limited to the above-described embodiments, and various modifications in design may be made without departing from the spirit and scope of the invention defined in claims.

What is claimed is:

1. A network switch, said network switch comprising:
   at least one data port interface for receiving data;
   at least one link interface configured to transmit said data between said network switch and other network switches; and
   a data processor, connected to said at least one data port interface and said at least one link interface, said data processor including,
   a segmented ring configured to connect to a plurality of dedicated modules designed to process said data;
   a programmable ring dispatcher for dispatching a portion of said data along said segmented ring to at least one of said plurality of dedicated modules; and
   a command processor for processing commands received from said dedicated modules,
   wherein said programmable ring dispatcher determines a first dedicated module of said plurality of dedicated modules to receive said portion of said data and said first dedicated module determines a next destination for said portion of said data selected from said plurality of dedicated modules and said command processor, and
   wherein, any one of said plurality of dedicated modules, sends as request for an entire packet or other portions thereof, to any one of the plurality of dedicated modules if said portion of said data is not sufficient for processing the data packet.

2. A network switch according to claim 1 wherein said at least one data port interface is configured to receive data which includes a packet having headers, said portion of said data comprises a parsed field derived from said headers.

3. A network switch according to claim 2 wherein said programmable ring dispatcher includes a set of rules for determining which of said plurality of dedicated modules receives said parsed field based on values contained in said parsed field and dispatches said parsed field to said determined dedicated module.

4. A network switch according to claim 1 wherein said segmented ring is configured to connect to a variable plurality of dedicated modules which varies in number and type based on the networking environment of said network switch.

5. A network switch according to claim 1, wherein at least one other dedicated module is added to the segmented ring, according to system requirements.

6. A method of processing data by a network switch, said method comprising the steps of:
   receiving data by said network switch;
   parsing said data to obtain a portion of said data;
   first dispatching said portion of said data, along a segmented ring having a plurality of dedicated modules designed to process said data, to a first dedicated module of said plurality of dedicated modules based on content of said portion of said data;
   processing said portion of said data by said first dedicated module, wherein any one of said plurality of dedicated modules sends a request for an entire packet or other portions thereof to any one of the plurality of dedicated modules, if said portion of said data is not sufficient for processing the data packet;
   second dispatching at least said portion of said data along said segmented ring by said first dedicated module to additional dedicated modules of said plurality of dedicated modules or to a command processor of said network switch; and forwarding data from said network switch based on processing performed by at least one of said dedicated modules.

7. A method of processing data by a network switch according to claim 6 wherein said step of parsing said data to obtain a portion of said data comprises parsing packets having headers to obtain a parsed field derived from said headers.

8. A method of processing data by a network switch according to claim 7 wherein said step of first dispatching a portion of said data is performed according to a set of rules for determining which of said plurality of dedicated modules receives said parsed field based on values contained in said parsed field.

9. A method of processing data by a network switch according to claim 6, wherein said step of first dispatching a portion of said data comprises dispatching to a specified plurality of dedicated modules, which is varied in number and type, based on the networking environment of said network switch.

* * * * *